United States Patent
Rittmeyer et al.

(10) Patent No.: US 9,447,822 B2
(45) Date of Patent: Sep. 20, 2016

(54) BUG ROLLER BEARING OUTER RACE ASSEMBLY

(75) Inventors: Gregory Alan Rittmeyer, Winnebago, IL (US); Timothy R. Welch, Roscoe, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 682 days.

(21) Appl. No.: 13/422,169

(22) Filed: Mar. 16, 2012

(65) Prior Publication Data

US 2013/0243361 A1     Sep. 19, 2013

(51) Int. Cl.
| | |
|---|---|
| *F16C 43/04* | (2006.01) |
| *F16C 35/067* | (2006.01) |
| *H02K 5/173* | (2006.01) |
| *H02K 15/00* | (2006.01) |
| *F16C 33/58* | (2006.01) |
| *F16C 19/26* | (2006.01) |

(52) U.S. Cl.
CPC ........... *F16C 35/067* (2013.01); *F16C 33/586* (2013.01); *H02K 5/1732* (2013.01); *H02K 15/0006* (2013.01); *F16C 19/26* (2013.01); *F16C 2237/00* (2013.01)

(58) Field of Classification Search
CPC .. F16C 35/063; F16C 35/067; F16C 35/077; F16C 35/00; F16C 35/045; F16C 35/06; F16C 35/07; F16C 19/36; F16C 19/52; F16C 19/525
USPC ....... 384/585, 584, 557, 493, 542, 559–561, 384/569, 513, 537
See application file for complete search history.

(56) References Cited

U.S. PATENT DOCUMENTS

| | | | |
|---|---|---|---|
| 3,777,195 A | 12/1973 | Pottter | |
| 3,990,753 A | 11/1976 | Kellstrom et al. | |
| 4,226,485 A | * 10/1980 | Pruvot | 384/557 |
| 4,252,035 A | 2/1981 | Cordner et al. | |
| 4,473,309 A | 9/1984 | Box | |
| 4,682,938 A | 7/1987 | Riordan | |
| 4,728,841 A | 3/1988 | Sugden | |
| 5,073,039 A | * 12/1991 | Shervington | 384/278 |

(Continued)

FOREIGN PATENT DOCUMENTS

| | | |
|---|---|---|
| CN | 201651044 | 11/2010 |
| DE | 102010039969 | 3/2012 |

(Continued)

*Primary Examiner* — Richard W Ridley
*Assistant Examiner* — Yamilka Pinero Medina
(74) *Attorney, Agent, or Firm* — Carlson, Gaskey & Olds, P.C.

(57) ABSTRACT

An outer bearing race for use in a generator housing includes a body having a radially inner surface for contacting bearings. The radially inner surface has a right side and a left side with a chamfer attaching to the right side of the radially inner surface for leading the bearings into contact with the radially inner surface. A right surface extends radially outwardly from the chamfer and a left surface extends radially outwardly from the left side. A ledge extends axially from the left surface and parallel and in register with the radially inner surface. A first angled surface extends radially outwardly from the right side surface and axially towards the left surface and a second angled surface extends radially outwardly from the ledge and axially towards the right side surface. A first extension extends radially outwardly from and attaches to the first angled surface and the second angled surface.

17 Claims, 3 Drawing Sheets

(56) References Cited

U.S. PATENT DOCUMENTS

| | | |
|---|---|---|
| 5,300,848 A | 4/1994 | Huss et al. |
| 5,456,538 A | 10/1995 | Honda et al. |
| 5,586,826 A | 12/1996 | Kellstrom et al. |
| 6,132,097 A | 10/2000 | Kellstrom |
| 6,260,667 B1 | 7/2001 | Sugden |
| 7,178,325 B2 | 2/2007 | Arbona |
| 7,627,941 B2 | 12/2009 | Shervington et al. |
| 8,556,518 B2 * | 10/2013 | Shahamat et al. ............ 384/493 |

FOREIGN PATENT DOCUMENTS

| | | | |
|---|---|---|---|
| JP | 2010242951 | 10/2010 | |
| WO | WO 9514865 A1 * | 6/1995 | .............. F16C 27/04 |

* cited by examiner

BUG ROLLER BEARING OUTER RACE ASSEMBLY

BACKGROUND OF THE INVENTION

The present invention relates to a generator and more particularly to a generator bearing in which bearing skew is minimized.

Generators for generating electricity in aircraft applications are generally operated at high speeds, e.g., over 10,000 rpm. At such high operating speeds, a failure of the rotor bearings can cause damage. Such high speed revolutions per minute also tend to wear the bearings and their races prematurely if either of the bearings or the races become misaligned.

SUMMARY OF THE INVENTION

According to an exemplary embodiment disclosed herein, an outer bearing race for use in a generator housing includes a body having a radially inner surface for contacting bearings. The radially inner surface has a right side and a left side with a chamfer attaching to the right side of the radially inner surface for leading the bearings into contact with the radially inner surface. A right surface extends radially outwardly from the chamfer and a left surface extends radially outwardly from the left side. A ledge extends axially from the left surface and in parallel to and in register with the radially inner surface. A first angled surface extends radially outwardly from the right side surface and axially towards the left surface and a second angled surface extends radially outwardly from the ledge and axially towards the right side surface. A first extension extends radially outwardly from and attaches to the first angled surface and the second angled surface.

According to another exemplary embodiment disclosed herein, an outer race bearing assembly for a generator includes an outer bearing race, a lining in a generator housing, and a position ring for spacing the outer bearing race from the lining in the generator housing.

According to another exemplary embodiment disclosed herein, a position ring for use with an outer race bearing assembly includes a radially extending body, the radially extending body having a first extension extending axially from a top portion of the body for engaging a top portion of the outer race bearing assembly, a second extension extending axially from a bottom portion of the body for engaging a liner in the generator housing.

According to another exemplary embodiment disclosed herein, a method for replacing a portion of a first outer bearing assembly for a generator with a second outer bearing assembly, the first outer bearing assembly including a first liner and a first outer bearing race, includes the steps of: removing the first outer bearing race and first liner, installing a second liner and, machining to a given diameter, inserting a position ring against the machined liner and against a generator housing, inserting a second bearing race against the position ring and connecting the second bearing race against the position ring and against a generator housing.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
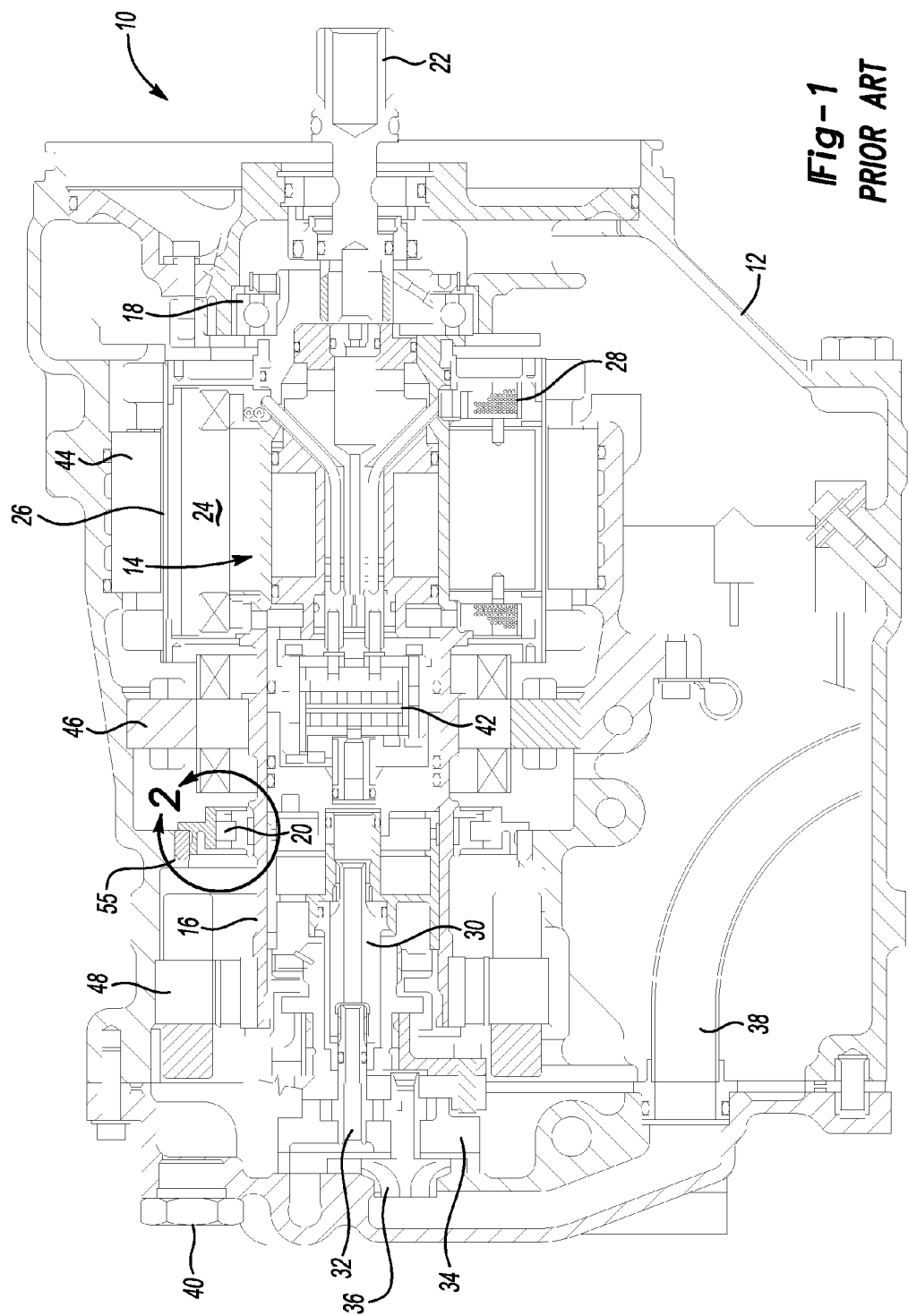
FIG. 1 is a cross-sectional view of a known embodiment of a generator including a prior art bearing.

FIG. 1 shows the cross-sectional view of a generator 10. The generator 10 is, for example, a generator for supplying electricity to an aircraft. The generator shown in FIG. 1 is, e.g., of the type used as a back-up generator for a Boeing 777. The basic structure of such a generator 10 is known in the art.

The generator 10 includes a main housing 12 in which a rotor, generally designated by the reference numeral 14, is supported. The rotor 14 includes a rotor shaft 16 supported in the housing 12 by ball bearing 18 and roller bearing structure 20. The rotor shaft includes an input shaft 22 which is connected to a driving source, e.g., a gear box shaft from a reducing gear box from the engine. The rotor 14 includes a rotor core 24, a rotor sleeve 26 and main field windings 28. The anti-drive end of the rotor 14, i.e., the end opposite the input shaft 22, includes a pump drive section 30 connected to a pump gear set 32 for operating a supply pump 34 having pump impeller 36 connected to scavenge inlet 38. A vacuum brake valve 40 is also provided.

The rotor 14 is provided with a rectifier bridge 42, while the housing 12 is also provided with a main armature 44, an exciter stator 46 and a permanent magnet generator (PMG) armature 48. Such a generator can generate electricity for the electrical system of an aircraft as is known in the art.

Figure 2:
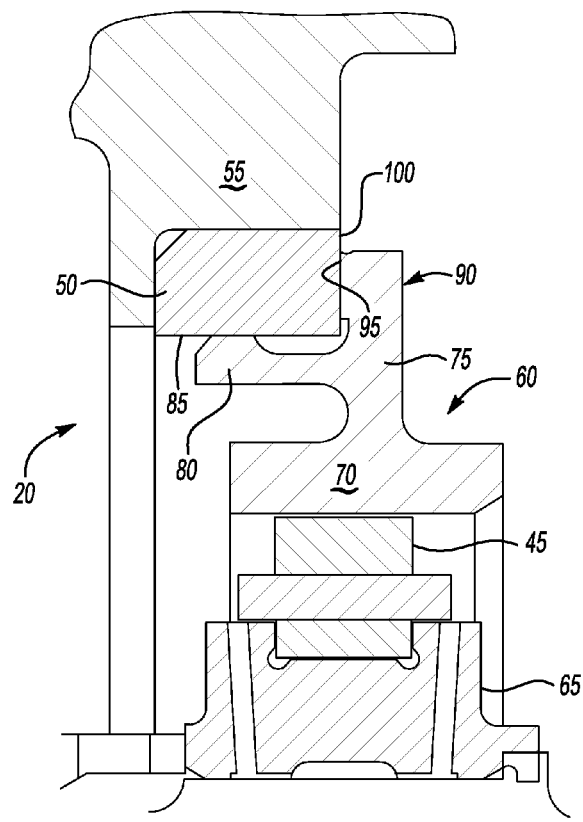
FIG. 2 is an enlarged cross-sectional view taken along the line 2-2 showing the prior art bearing in more detail.

Referring now to FIG. 2, a prior art roller bearing 20 is shown in detail. The bearing structure 20 includes a roller bearing(s) 45, a cylindrical liner 50 that is interference fitted into a bearing housing 55, an outer bearing race 60 and an inner bearing race 65 having a given diameter. The outer bearing race 60 has a roughly rectangular bearing block 70, a flange 75 extending radially outward from the bearing block 70, a spring arm 80 extending at a right angle to the flange 75, the spring arm attaching to a radially inward surface 85 of the housing and a top portion 90 extending from flange 75, the top portion 90 attaching at a left side 95 thereof to a right side 100 of the liner 50. The liner 50 is an interference fit with the bearing housing and the spring arm 80 thereon.

During operation of the prior art bearing 20, however, it has been discovered that as the housing 12 heats up during operation, the amount of interference fit that tapers the bearing block 70 may cause the bearings 45 to skew, which may limit the life of the bearings 45.

Figure 3:
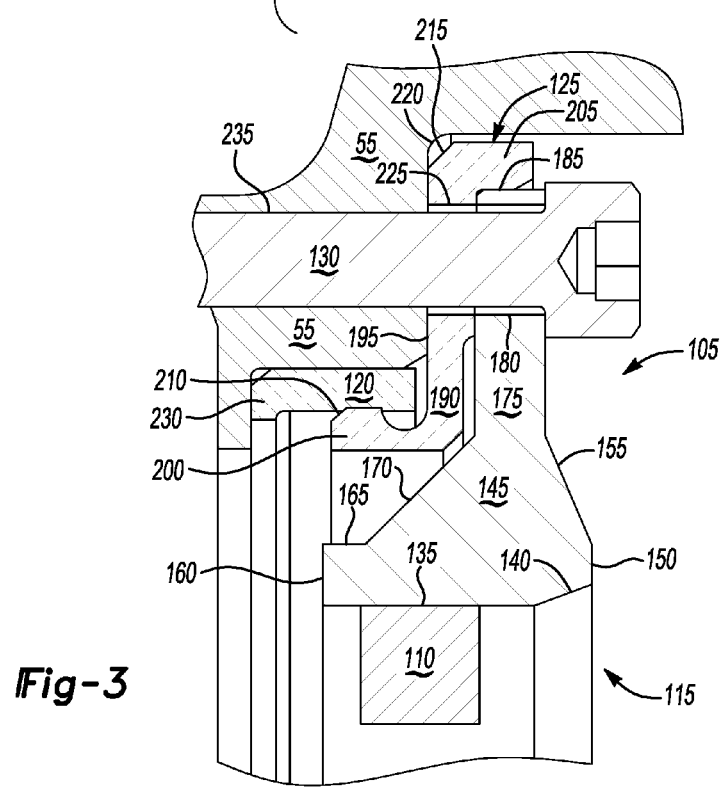
FIG. 3 is an enlarged cross-sectional view of an embodiment of a bearing for use in the generator in place of the prior art bearing.

Referring to FIG. 3, a cylindrical bearing structure 105 that minimizes skew on the bearing(s) 110 is shown according to an embodiment of the invention. The cylindrical bearing structure 105 includes an outer bearing race 115, a liner 120, bearing housing 55, and a position ring 125. The liner 120 is interference fit into the bearing housing 55 and the race 115 and the position ring 125 are attached to the housing 55 by an attachment 130 such as a bolt or screw 130 or the like. The bearing structure 105 is designed to fit in the same envelope filled by the bearing structure 20.

The outer bearing race 115 has a roughly triangular body 145 that is defined by a radially inner race surface 135, a chamfer 140 functioning as a bearing 110 lead-in surface and angling radially outwardly and to a right side surface 150 extending radially outwardly from the chamfer 140, a left side surface 160 extending radially outwardly from said inner race surface 135, a first angled surface 155 extending radially outwardly from the right side surface 150 and axially towards the left side surface 160, a ledge 165 extending axially from the left side surface 160 and parallel to the inner race surface 135, a second angled surface 170 extending radially outwardly from the ledge 165 and axially towards the right side surface 150, and a roughly rectangular extension 175 attaching to the first angled surface 155 and the second angled surface 170. The extension 175 has a top surface 185 and an opening 180 for receiving the bolt 130 therethrough.

The cylindrical position ring 125 has a generally s-shaped body 190. The position ring 125 functions to align the outer bearing race 115 with the inner bearing race 65 and acts as a spring to maintain contact with the liner 120 that is in an interference fit with the housing 55. The body 190 has a vertical portion 195, a bottom portion 200 extending towards the liner 120 and a top portion 205 extending over and fitting with the top surface 185 of the outer bearing race 115. The bottom portion 200 has an upwardly extending finger 210 for maintaining contact with the liner 120 into the housing 55. A chamfer 215 exists between the vertical portion 195 and the top portion 205 to enable the position ring 125 to be placed against the housing 55 without interfering with a curved portion 220 of the housing 55. The vertical portion 195 has a hole 225 therein that aligns with the opening 180 in the outer bearing race 115 for receiving the bolt 130 therethrough.

By moving the function of the spring arm 80 to the position ring 125, there is no taper placed on the outer bearing race 115. Taper is reduced from about 0.0013"/inch or 0.033/mm to about 0.0002"/inch or 0.00508/mm from the prior art to the instant disclosure. Bearing skew is reduced and bearing life extended. The remaining taper may be caused by normal thermal distortion or machining tolerances.

Figure 4:
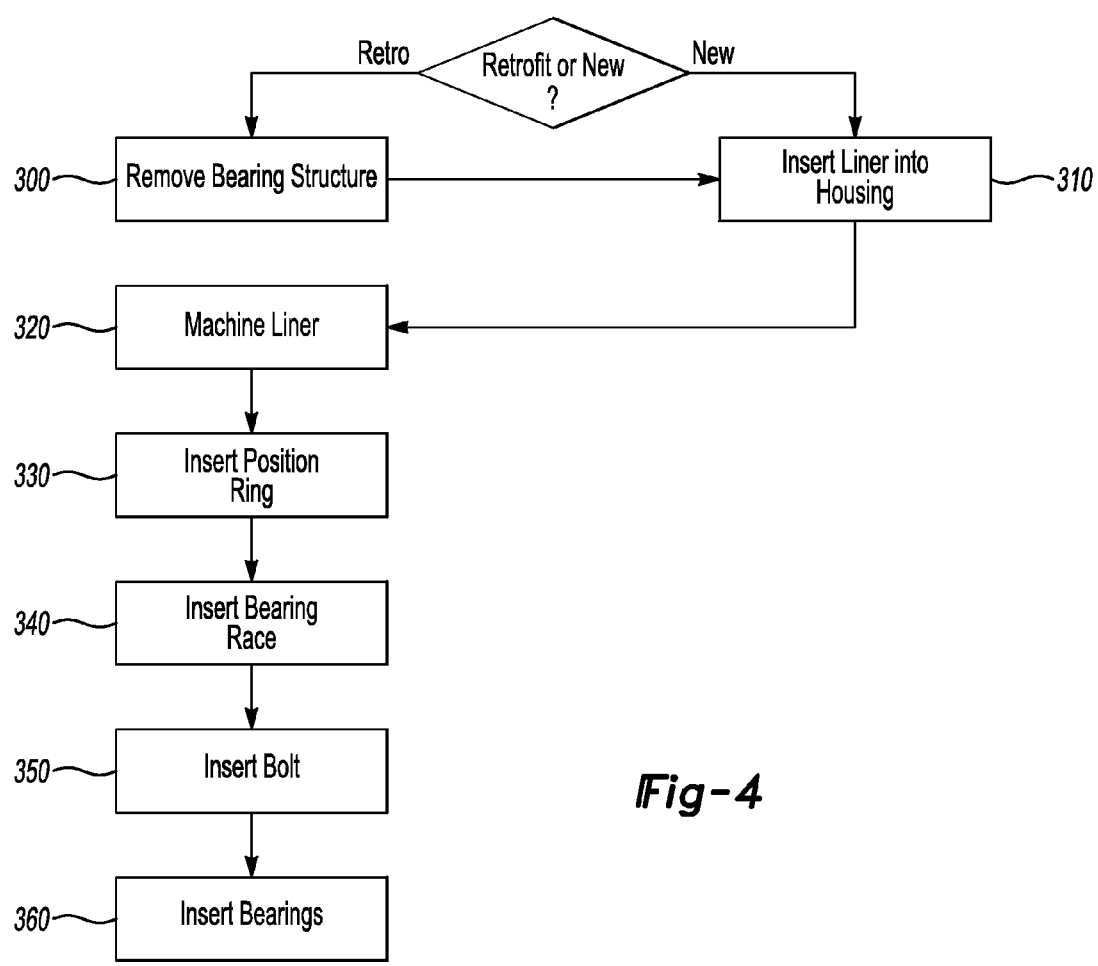
FIG. 4 shows a method of constructing the bearing of FIG. 3.

Referring now to FIG. 4, to retrofit the outer bearing race into the generator 10, the bearing structure 20 including liner 50 is removed (step 300). The liner 120 is installed in place (step 310) and machined in place until that allows the same spacing for the bearing race 115 and position ring 125 as in the bearing block 70 (step 320). The liner 120 is left with radially inwardly depending portion 230 that is harder to machine away and not necessary to remove. The housing 55 has an aperture 235 therethrough to receive bolt 130 and that is to be aligned with the hole 225 in the vertical portion 195 and the opening 180 in the outer bearing race 115. The position ring 125 is then inserted in the housing 55 with its finger 210 abutting the liner 120 (step 330) and the bearing race 115 is inserted in the position ring 125 with its top surface 185 nested under the upper portion 205 (step 340). The bolt 130 is then inserted through the opening 180 in the outer bearing race 115, the hole 225 in the vertical portion 195, and into the aperture 235 (step 350). The bearings 110 are then inserted into the radially inner race surface 135 by the chamfer surface 140 (step 360). For new construction, a liner 120 is fitted into the housing 55 as with the prior art, e.g. press fit or by expanding the housing 55 by heat or the like (step 310).

The preceding description is exemplary rather than limiting in nature. One of ordinary skill in the art may use the teachings herein to apply a new bearing race to other types of machinery. Variations and modifications to the disclosed examples may become apparent to those skilled in the art that do not necessarily depart from the essence of this disclosure. The scope of legal protection given to this disclosure can only be determined by studying the following claims.

The invention claimed is:

1. An outer bearing race for use in a generator housing, said outer bearing race comprising:
   a first body, said first body having:
      a radially inner surface for contacting bearings said surface having a right side and a left side;
      a chamfer attaching to said right side of said radially inner surface for leading said bearings into contact with said radially inner surface;
      a right surface extending radially outwardly from said chamfer;
      a left surface extending radially outwardly from said left side;
      a ledge extending axially from said left surface and in parallel to said radially inner surface;
      a first angled surface extending radially outwardly from the right surface and axially towards the left surface;
      a second angled surface extending radially outwardly from the ledge and axially towards the right surface; and
      a first extension extending radially outwardly from and attaching to the first angled surface and the second angled surface.

2. The outer race of claim 1 wherein said first extension has an opening for receiving a bolt.

3. The outer bearing race of claim 1 further comprising:
   a positioning ring for disposal between said first body and said housing.

4. The outer bearing race of claim 3 wherein said positioning ring comprises:
   a radially extending second body, said radially extending second body having:
      a second extension extending axially from a top portion of said first body for engaging a top portion of said first extension; and
      a third extension extending axially from a bottom portion of said first body for engaging a liner disposed in said generator housing.

5. The outer bearing race of claim 4 wherein said positioning ring further comprises:
   an opening for receiving a bolt disposed in said radially extending second body.

6. The outer bearing race of claim 4 wherein said second extension and said third extension extend from opposite sides of said radially extending second body.

7. The outer bearing race of claim 4 wherein said positioning ring further comprises:
   a finger extending radially outwardly from said third extension for engaging said liner.

8. An outer race bearing assembly for a generator, said outer race bearing assembly comprising:
   an outer bearing race including a first body having a radially inner surface for contacting bearings, said radially inner surface having a right side, and a chamfer attaching to said right side of said radially inner surface for leading said bearings into contact with said radially inner surface;
   a lining for disposal in a generator housing; and
   a position ring for maintaining said lining disposed in said generator housing and for spacing said outer bearing race from said housing.

9. The outer race bearing assembly of claim 8 further comprising:
an attachment for attaching said position ring to said housing and said outer bearing race to said position ring.

10. The outer race bearing assembly of claim 8 wherein said outer bearing race comprises:
said first body having;
said radially inner surface for contacting said bearings, said surface having a left side;
a right surface extending radially outwardly from said chamfer;
a left surface extending radially outwardly from said left side;
a ledge extending axially from said left surface and in parallel to said radially inner surface;
a first angled surface extending radially outwardly from the right surface and axially towards the left surface;
a second angled surface extending radially outwardly from the ledge and axially towards the right side surface; and
a first extension extending radially outwardly from and attaching to the first angled surface and the second angled surface.

11. The outer race of claim 10 wherein said first extension has an opening for receiving a bolt.

12. The outer race bearing assembly of claim 10 said position ring including:
a radially extending second body, said radially extending second body having:
a second extension extending axially from a top portion of said second body for engaging a top portion of said first extension; and
a third extension extending axially from a bottom portion of said second body for engaging said lining disposed in said generator housing.

13. The outer bearing race of claim 12 wherein said position ring further comprises:
an opening for receiving a bolt disposed in said radially extending second body.

14. The outer bearing race of claim 12 wherein said inner position ring urges said lining into contact with said generator housing.

15. A position ring for use with an outer race bearing assembly, said position ring comprising:
a radially extending body, said radially extending body having:
a first extension extending axially from a radially outer end of said body for engaging a radially outer end of said outer race bearing assembly;
a second extension extending axially from a radially inner end of said body for engaging a liner disposed in a generator housing, and
an opening for receiving a bolt; said outer race bearing assembly includes an outer bearing race comprising: a first body, said first body having; a radially inner surface for contacting bearings said surface having a right side and a left side; a chamfer attaching to said right side of said radially inner surface for leading said bearings into contact with said radially inner surface; a right surface extending radially outwardly from said chamfer; a left surface extending radially outwardly from said left side; a ledge extending axially from said left surface and in parallel to said radially inner surface; a first angled surface extending radially outwardly from the right surface and axially towards the left surface; a second angled surface extending radially outwardly from the ledge and axially towards the fight surface; and a first extension extending radially outwardly from and attaching to the first angled surface and the second angled surface.

16. The position ring of claim 15 wherein said first extension and said second extension extend from opposite sides of said radially extending body.

17. The position ring of claim 15 wherein said position ring further comprises:
a finger extending radially outwardly from said second extension for engaging said liner.

* * * * *

UNITED STATES PATENT AND TRADEMARK OFFICE
CERTIFICATE OF CORRECTION

| | |
|---|---|
| PATENT NO. | : 9,447,822 B2 |
| APPLICATION NO. | : 13/422169 |
| DATED | : September 20, 2016 |
| INVENTOR(S) | : Gregory Alan Rittmeyer |

Page 1 of 1

It is certified that error appears in the above-identified patent and that said Letters Patent is hereby corrected as shown below:

In the Claims

In Claim 14, Column 6, Line 1: delete "inner"

In Claim 15, Column 6, Line 28: delete "fight" and replace with --right--

Signed and Sealed this
Fourth Day of April, 2017

Michelle K. Lee
*Director of the United States Patent and Trademark Office*